US008305643B2

(12) United States Patent
Park et al.

(10) Patent No.: US 8,305,643 B2
(45) Date of Patent: Nov. 6, 2012

(54) IMAGE PROCESSING APPARATUS AND CONTROL METHOD THEREOF

(75) Inventors: Ji-yong Park, Suwon-si (KR); Sang-kyun Im, Seoul (KR); Kyu-yul Choi, Yongin-si (KR); Myung-jin Cho, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1307 days.

(21) Appl. No.: 11/960,780

(22) Filed: Dec. 20, 2007

(65) Prior Publication Data

US 2008/0292203 A1 Nov. 27, 2008

(51) Int. Cl.
*G06K 9/36* (2006.01)

(52) U.S. Cl. ........ 358/3.13; 358/1.13; 358/1.9; 382/266

(58) Field of Classification Search ................. 358/3.13, 358/1.9, 1.13; 725/38; 708/250; 345/63, 345/89, 596, 597, 690; 382/266
See application file for complete search history.

(56) References Cited

U.S. PATENT DOCUMENTS 6,008,794 A * 12/1999 Ishii .............................. 345/598
6,028,677 A * 2/2000 Keithley ........................ 358/1.9
6,219,838 B1 * 4/2001 Cherichetti et al. ............ 725/38
6,795,085 B1 * 9/2004 Doherty et al. ............... 345/596
7,046,098 B2 * 5/2006 Staszewski ................... 331/158
2005/0206587 A1 9/2005 Baek
2006/0039558 A1 * 2/2006 Morii et al. ..................... 380/46
2007/0192389 A1 * 8/2007 Chang et al. .................. 708/250
2008/0055651 A1 * 3/2008 Wei .............................. 358/3.13

FOREIGN PATENT DOCUMENTS

KR 2003-0086854 A 11/2003
KR 10-2005-0032847 A 4/2005
KR 10-2005-0101442 A 10/2005

OTHER PUBLICATIONS

Communication from the Korean Intellectual Property Office, dated Sep. 19, 2011, issued in counterpart Korean Application No. 10-2007-0049239.

* cited by examiner

*Primary Examiner* — King Poon
*Assistant Examiner* — Allen H Nguyen
(74) *Attorney, Agent, or Firm* — Sughrue Mion, PLLC

(57) ABSTRACT

An image processing apparatus which performs dithering to an input image, includes: an input value storage unit which stores an input value to generate a mask seed value corresponding to a single pixel in a unit area among a plurality of pixels displaying an image, wherein the unit area includes a first line and at least second line; and a seed value generator which generates the mask seed value corresponding to one of pixels in the at least one second line among the pixels of the unit area based on the input value stored in the input value storage unit.

21 Claims, 9 Drawing Sheets

IMAGE PROCESSING APPARATUS AND CONTROL METHOD THEREOF

CROSS-REFERENCE TO RELATED APPLICATIONS

This application claims priority from Korean Patent Application No. 10-2007-0049239, filed on May 21, 2007 in the Korean Intellectual Property Office, the disclosure of which is incorporated herein by reference.

BACKGROUND OF THE INVENTION

1. Field of the Invention

Apparatuses and methods consistent with the present invention relate to an image processing apparatus and a control method thereof, and more particularly, to an image processing apparatus which performs dithering to output an image of high-quality, and a control method thereof.

2. Description of the Related Art

Generally, an image processing apparatus such as a plasma display panel (PDP) device processes an image signal such as a broadcasting signal to display an image thereon. While processing R, G and B image signals, the image processing apparatus applies a de-gamma compensation to the image signals to improve brightness.

In this case, a noise occurs in a low gray scale, and deteriorates image quality. Thus, the image processing apparatus performs dithering to prevent deterioration of the image quality. Dithering is used to reduce false contour by adding noise properly to a gray scale of an image to be displayed.

Hereinafter, a dithering method of a related art image processing apparatus will be described with reference to FIGS. 1 and 2. FIG. 1 is a control block diagram of the related art image processing apparatus. As shown therein, the related art image processing apparatus includes a signal input unit 1, a random generator 2, a line buffer 3, a frame buffer 4, a dithering performer 5 and a display unit 6.

The random generator 2 generates a random value to determine a mask seed value of respective frames in an image input by the signal input unit 1. Here, the random generator 2 generates the random value in every M×N positions of the respective pixels with position information of the pixels displaying the image, and generates the mask seed value corresponding thereto.

The mask seed value is used to perform dithering by the dithering performer 5 (to be described later), and to determine a mask matrix corresponding to the concerned mask seed value in the respective pixel positions.

The identical mask seed value is used during one period in the related art image processing apparatus. Thus, the mask seed value generated by the random generator 2 is stored during the one period. In this case, the single period includes at least one line and at least one frame.

As shown in FIG. 2, a mask seed value per line (8*a*, 8*b*) is stored in the line buffer 3 while a mask seed value of plural lines corresponding to a single frame (8*a*, 8*b*, 8*c*, 8*d*) is stored in the frame buffer 4. As the period changes, the random generator 2 generates a new random seed value. A new mask seed value is also stored in the line buffer 3 and/or the frame buffer 4.

The dithering performer 5 determines the mask matrix corresponding to the position of the pixel by using the mask seed value stored in the line buffer 3 and the frame buffer 4, and performs dithering with the determined mask matrix. That is, the dithering performer 5 adds the determined mask matrix values to input images r, g and b, and adjusts bits corresponding to an output standard to output images r', g' and b' having improved image quality. Then, the display unit 6 displays the images with improved quality.

To perform dithering by the related art image processing apparatus, however, the mask seed value which is generated by the random generator 2 should be stored in the line buffer 3 and frame buffer 4. That is, the related art image processing apparatus requires the line buffer 3 and the frame buffer 4, which raises production costs.

SUMMARY OF THE INVENTION

Exemplary embodiments of the present invention overcome the above disadvantages and other disadvantages not described above. Also, the present invention is not required to overcome the disadvantages described above, and an exemplary embodiment of the present invention may not overcome any of the problems described above.

An exemplary embodiment of the present invention provides an image processing apparatus which performs dithering to an input image without storing a mask seed value therein, and a control method thereof.

Another exemplary embodiment of the present invention provides an image processing apparatus which improves dithering-performing speed by performing dithering without a line buffer and a frame buffer storing a mask seed value, and a control method thereof.

Further, another exemplary embodiment of the present invention provides an image processing apparatus which reduces power consumption by removing operations of storing a mask seed value per line in a line buffer and of storing a mask seed value per frame in a frame buffer, and a control method thereof.

Additional aspects and features of the present invention will be set forth in part in the description which follows and, in part, will be obvious from the description, or may be learned by practice of the present invention.

According to an aspect of the present invention there is provided an image processing apparatus which performs dithering to an input image, including: an input value storage unit which stores an input value to generate a mask seed value corresponding to a single pixel in a unit area among a plurality of pixels displaying an image, wherein the unit area includes a first line and at least second line; and a seed value generator which generates the mask seed value corresponding to one of pixels in the at least one second line among the pixels of the unit area based on the input value stored in the input value storage unit.

According to an aspect of the invention, the seed value generator includes a linear feedback shift register (LFSR).

According to an aspect of the invention, the seed value generator operates the LFSR based on the input value, and generates the mask seed value based on an output value which is outputted by operating the LFSR.

According to an aspect of the invention, the seed value generator feedbacks the output value of a previous unit area to generate a random mask seed value with respect to a neighboring unit area.

According to an aspect of the invention, the input value stored in the input value storage unit includes at least one of a frame input value, a line input value and a pixel input value, and the seed value generator updates one of the frame input value, the line input value and the pixel input value stored in the input value storage unit with the output value of the previous unit area, and generates the changed mask seed value.

According to an aspect of the invention, the image processing apparatus further includes a pixel counter which counts a number of pixels of an input image, wherein the seed value generator determines whether a period of a new unit area begins based on the number of pixels counted by the pixel counter, and updates the pixel input value if it is determined that the period of the new unit area begins.

According to an aspect of the invention, the image processing apparatus further includes a line counter which counts the number of lines of an input image, wherein the seed value generator determines whether a period of a new unit area begins based on the number of lines counted by the line counter, and updates the line input value if it is determined that the period of the new unit begins.

According to an aspect of the invention, the image processing apparatus further includes a frame counter which counts the number of frames of an input image, wherein the seed value generator determines whether a period of a new unit area begins based on the number of frames counted by the frame counter, and updates the frame input value if it is determined that the period of the new unit begins.

According to an aspect of the invention, the input value stored in the input value storage unit is set by a user.

According to an aspect of the invention, the image processing apparatus further includes a dithering performer which performs dithering by using the mask seed value generated by the seed value generator.

According to an aspect of the invention, the image processing apparatus further includes a display unit which displays an image signal that is dithered by the dithering performer.

According to an aspect of the present invention there is provided an image processing apparatus which performs dithering to an input image, including: an input value storage unit which stores an input value to generate a mask seed value corresponding to a single pixel in a unit area among a plurality of pixels displaying an image, wherein the unit area includes a first frame and at least second frame; and a seed value generator which generates the mask seed value corresponding to one of pixels in the at least one second frame among the pixels of the unit area, based on the input value stored in the input value storage unit.

According to an aspect of the present invention there is provided a control method of an image processing apparatus which performs dithering to an input image, including: storing an input value to generate a mask seed value corresponding to a single pixel in a unit area among a plurality of pixels displaying an image, wherein the unit area includes a first line and at least second line; and generating the mask seed value corresponding to one of pixels in the at least one second line among the pixels of the unit area based on the stored input value.

According to an aspect of the invention, the generating the seed value includes generating the seed value by using a linear feedback shift register (LFSR).

According to an aspect of the invention, the generating the seed value includes operating the LFSR based on the input value, and generating the mask seed value based on an output value which is outputted by operating the LFSR.

According to an aspect of the invention, the generating the seed value includes feeding back the output value of a previous unit area to generate a random mask seed value with respect to a neighboring unit area.

According to an aspect of the invention, the input value includes at least one of a frame input value, a line input value and a pixel input value, and generating the seed value includes updating one of the stored frame input value, line input value and pixel input value with the output value of the previous unit area, and generating the changed mask seed value.

According to an aspect of the invention, the control method further includes counting a number of pixels of an input image, wherein the generating the seed value includes determining whether a period of a new unit area begins, based on the counted number of pixels, and updating the pixel input value if the period of the new area begins.

According to an aspect of the invention, the control method further includes counting a number of lines of an input image, wherein the generating the seed value includes determining whether a period of a new unit area begins, based on the counted number of lines, and updating the line input value if the period of the new unit area begins.

According to an aspect of the invention, the control method further includes counting a number of frames of an input image, wherein the generating the seed value includes determining whether a period of a new unit area begins, based on the counted number of frames, and updating the frame input value if the period of the new unit area begins.

According to an aspect of the present invention there is provided a control method of an image processing apparatus which performs dithering to an input image, including: storing an input value to generate a mask seed value corresponding to a single pixel in a unit area among a plurality of pixels displaying an image, wherein the unit area includes a first frame and at least second frame; and generating the mask seed value corresponding to one of pixels in the at least one second frame among the pixels of the unit area, based on the stored input value.

BRIEF DESCRIPTION OF THE DRAWINGS

The above and/or other features of the present invention will become apparent and more readily appreciated from the following description of the embodiments, taken in conjunction with the accompany drawings of which.

DETAILED DESCRIPTION OF EXEMPLARY EMBODIMENTS

Hereinafter, exemplary embodiments of the present invention will be described with reference to accompanying drawings, wherein like numerals refer to like elements and repetitive descriptions will be avoided as necessary. The present invention, however, may be realized as various types, and is not limited to the exemplary embodiments.

Figure 1:
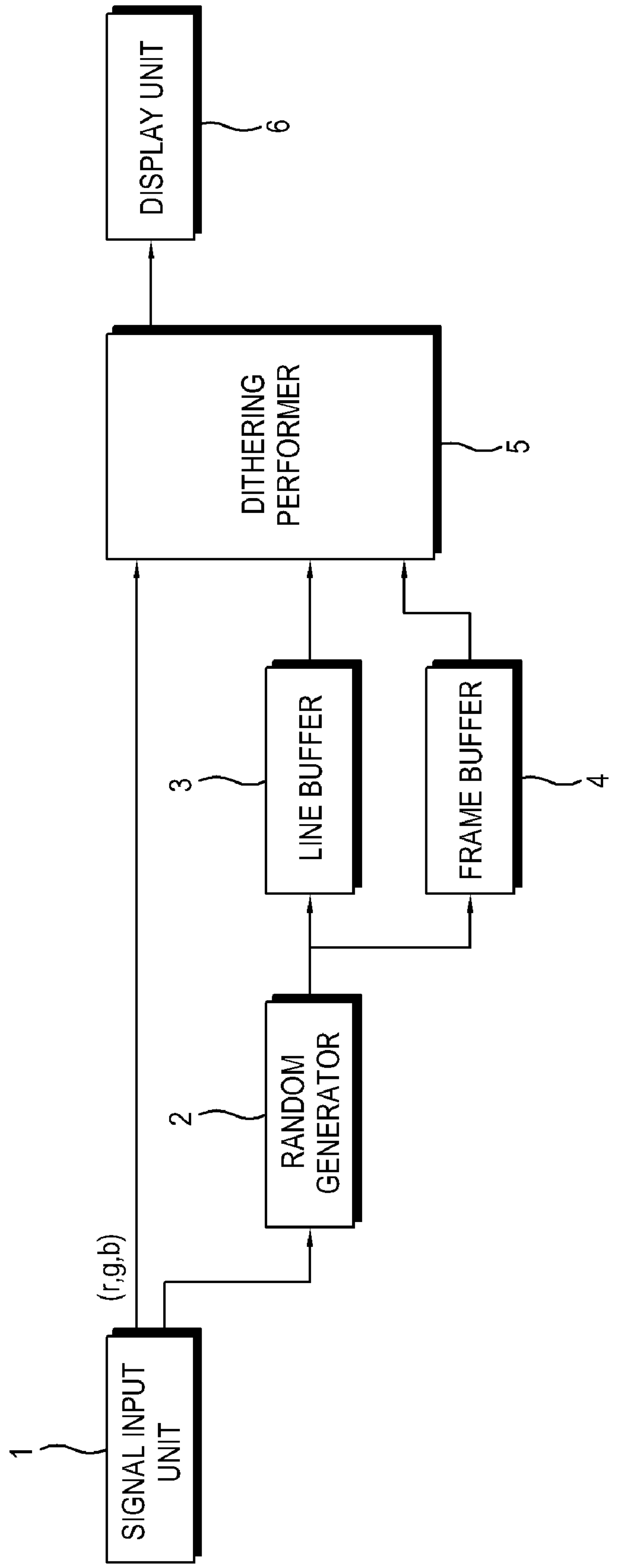
FIG. 1 (RELATED ART)
FIG. 1 is a control block diagram of a related art image processing apparatus.
Figure 2:
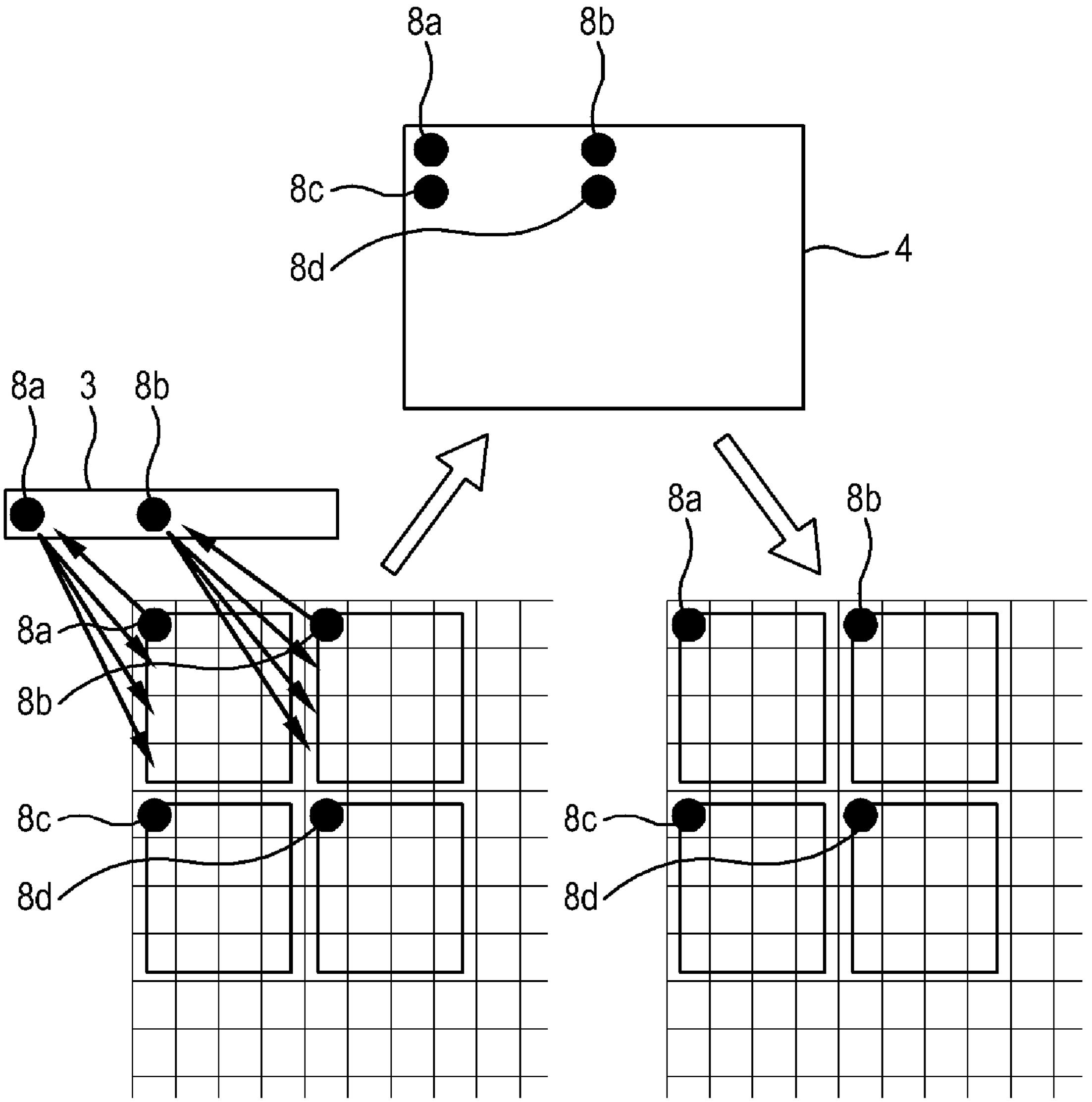
FIG. 2 (RELATED ART)
FIG. 2 illustrates a line buffer and a frame buffer storing a mask seed value generated by the related art image processing apparatus.
Figure 3:
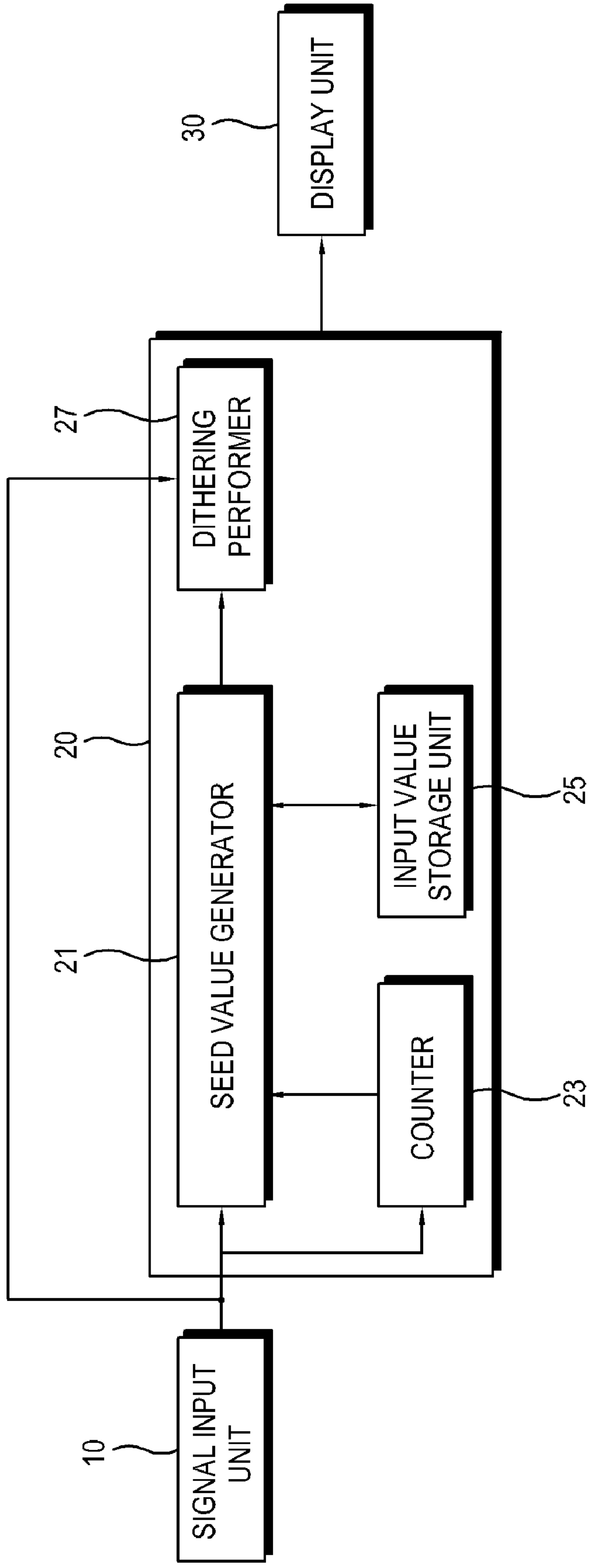
FIG. 3 is a control block diagram of an image processing apparatus according to an exemplary embodiment of the present invention.

FIG. 3 is a control block diagram of an image processing apparatus according to an exemplary embodiment of the present invention. As shown therein, the image processing apparatus according to the present invention includes a signal input unit 10, a signal processor 20 and a display unit 30.

The signal input unit 10 according to an exemplary embodiment of the present invention receives an image signal, and may include a tuner (not shown) to receive a broadcasting signal, and an external connection terminal (not shown) to receive an image signal from an external device.

The external connection terminal may include various connectors to receive image signals in various formats. For example, the signal input unit 10 may include at least one of a D-Sub connector, a composite video baseband signal (CVBS) connector, an S-video connector and a component connector to receive an image signal.

The signal processor 20 processes an input image signal. As shown in FIG. 3, the signal processor 20 according to an exemplary embodiment of the present invention includes a seed value generator 21, a counter 23, an input value storage unit 25 and a dithering performer 27.

The input value storage unit 25 stores an input value which is input to the seed value generator 21 (to be described later) to generate a mask seed value, and may be provided as a register. A user may set the input value to be stored in the input value storage unit 25. The input value may include various numbers except zero.

The counter 23 counts the number of pixels, the number of lines and the number of frames to determine positions of a pixel, a line and a frame displaying an image. The counter 23 may include a pixel counter to count the number of pixels, a line counter to count the number of lines and a frame counter to count the number of frames.

The counter 23 may count the numbers of pixels, of lines and of frames by using a synchronous signal input by the signal input unit 10. That is, the counter 23 may count the number of frames by counting a vertical synchronous signal and count the number of lines by counting a horizontal synchronous signal. Also, the counter 23 may count the number of pixels by counting a clock signal in the horizontal synchronous signal.

The seed value generator 21 may generate a mask seed value in every predetermined period, based on the input value stored in the input value storage unit 25. Here, the mask seed value refers to an ID number of a mask matrix in M×N size. The generated mask seed value is supplied to the dithering performer 27 (to be described later).

Figure 4:
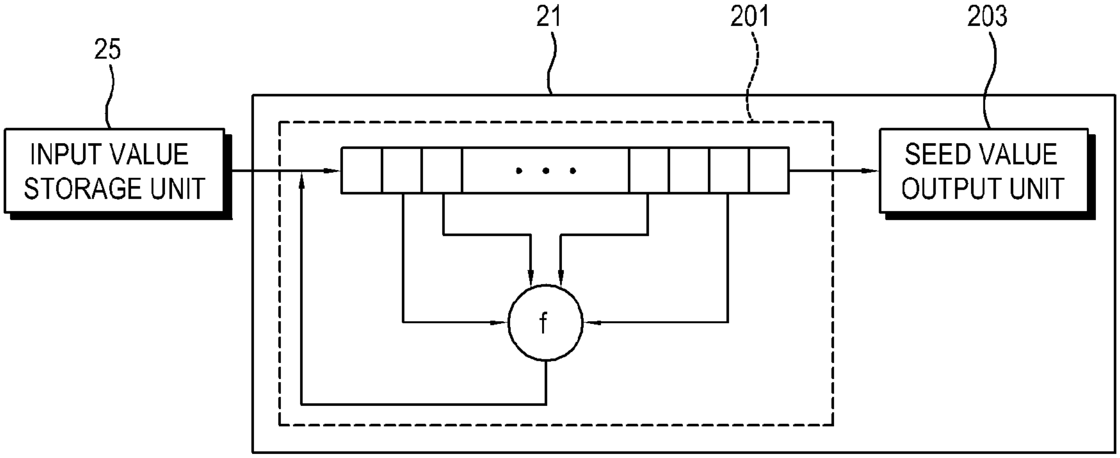
FIG. 4 illustrates a seed value generator according to the exemplary embodiment of the present invention.

As shown in FIG. 4, the seed value generator 21 according to an exemplary embodiment of the present invention may include a linear feedback shift register (hereinafter, to be referred to as LFSR) circuit 201, and a seed value output unit 203. If a predetermined input value is input, the LFSR circuit 201 performs LFSR operation and generates a random value. The seed value output unit 203 outputs the mask seed value which is generated according to the random value.

The LFSR circuit 201 performs LFSR operation with an input value having the number of bits satisfying a following Formula 1 to generate a random value without a noise pattern.

$$2^{LFSR\_BIT} \geq H\_SIZE \times V\_SIZE \quad \text{<Formula 1>}$$

Here, LFSR_BIT is the number of bits of the input value input to the LFSR circuit, H-SIZE is a horizontal size of an image and V_SIZE is a vertical size of the image.

Only the value of the predetermined number of bits among the input values stored in the input value storage 25 is input to a function f to generate the random value. The function f refers to XOR (exclusive OR).

The seed value generator 21 determines whether a period of a new unit area (a) begins, based on the numbers of frames, of lines and of pixels counted by the counter 23. Here, the unit area (a) includes at least two neighboring pixels among a plurality of pixels displaying an image. The unit area (a) has an identical size (M×N) to the mask matrix. The seed value generator 21 determines whether the new unit area (a) begins, by checking in order of the frames, lines and pixels.

The seed value generator 21 performs LFSR operation, and generates the mask seed value based on whether the new unit area (a) begins. The seed value generator 21 may check the position of the pixel with the numbers of pixels and of lines counted by the counter 23, and determine whether the period of the new unit area (a) begins. The seed value generator 21 divides the number of lines counted by the counter 23 by the number of lines N included in the unit area (a). If the remainder is 0, the seed value generator 21 determines that the period of the new unit area (a) begins.

For example, the number of the lines counted in a pixel position (12, 0) is 12. If 12 is divided by 4 which is the number of lines included in the unit area (a), the remainder is 0 (12%4=0). Then, the seed value generator 21 determines that the period of the new unit area (a) begins.

If it is determined that the period of the new unit area (a) begins, the seed value generator 21 updates the input value stored in the input value storage unit 25, and performs LFSR operation to the updated input value to generate the mask seed value.

Figure 5:
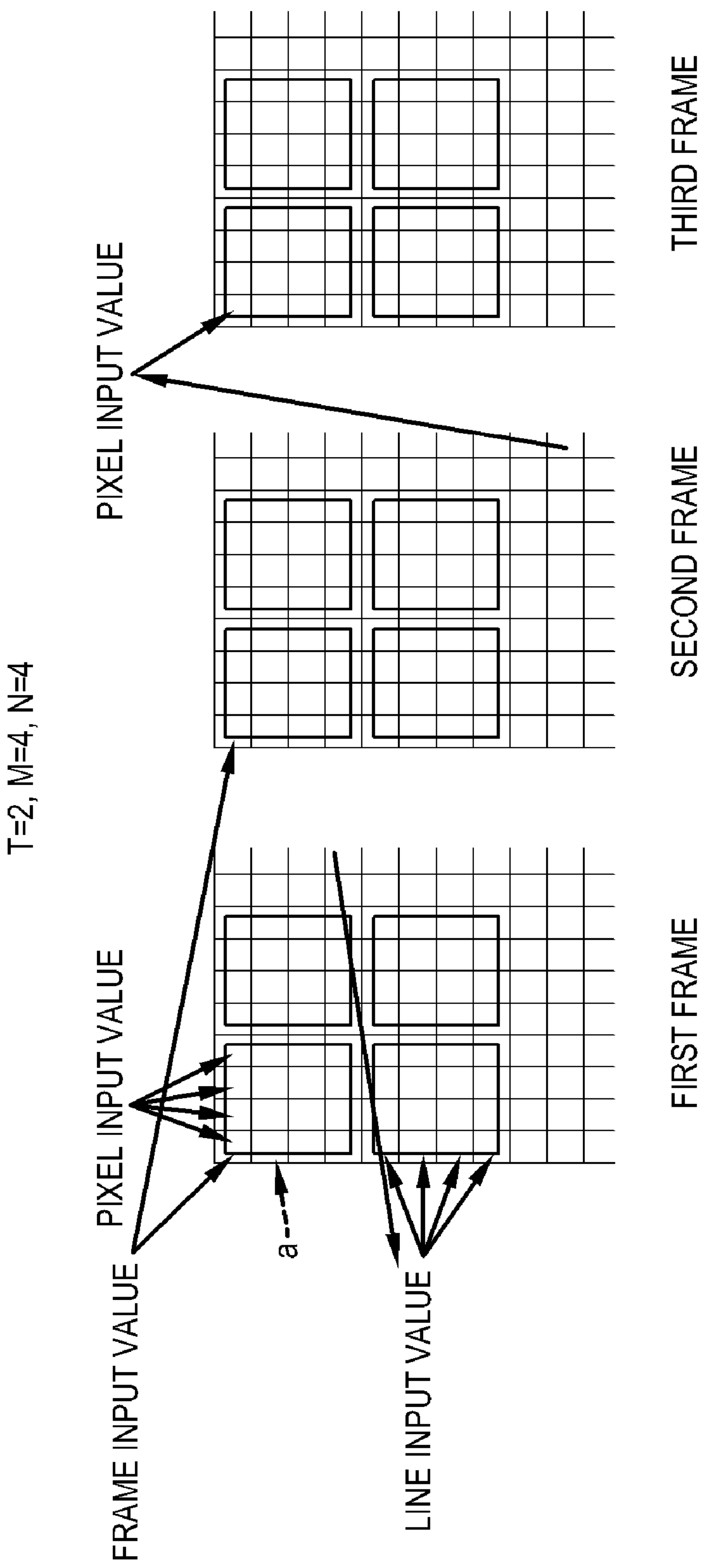
FIG. 5 illustrates a method of generating a mask seed value according to the exemplary embodiment of the present invention.

Hereinafter, a process of generating the mask seed value by the seed value generator 21 will be described in detail with reference to FIG. 5. It is assumed that the period of the unit area (a) according to an exemplary embodiment of the present exemplary embodiment is, 2 for a frame T, 4 for a line N and 4 for a pixel M and an image is displayed from left to right in one line for example.

A process of generating the mask seed value in one frame is as follows.

If an image signal is input, the counter 23 starts counting the numbers of frames, lines and pixels. The seed value generator 21 checks the input value stored in the input value storage unit 25. The seed value generator 21 stores a frame input value, a line input value and a pixel input value identical to the checked input value, in the input value storage unit 25. Here, the frame input value, the line input value and the pixel input value may be updated by the seed value generator 21.

If the position (hereinafter, to be referred to as ‘pixel position’) of displaying the image is (0,0), the numbers of lines and pixels counted by the counter 23 are 0, respectively. Then, the seed value generator 21 may determine that the new unit area (a) begins. The seed value generator 21 inputs the line input value stored in the input value storage unit 25 to the LFSR circuit 201, and generates the mask seed value.

If the number of frames, lines or pixels is changed, the seed value generator 21 inputs the frame input value, the line input value or the pixel input value to the LFSR circuit 201 to perform the LSFR operation.

As the period of the unit area (a) for the pixels is 4, the pixel positioned from (0,1) to (0,3) are in the same unit area (a) as the pixel positioned at (0,0). Thus, the seed value generator 21 does not perform LFSR operation and instead uses the mask seed value generated in the pixel position (0,0). The seed value generator 21 may input the line input value input in the pixel position (0,0) to the LFSR circuit 201 and generate the mask seed value in the pixel positions (0,1) to (0,3) identical to that in the pixel position (0,0).

With the foregoing method, the seed value generator 21 may generate the same mask seed values within the single unit area (a).

If the pixel position is (0,4), the seed value generator 21 determines that the period of the new unit area (a) begins, and inputs an input value different from that input in the pixel positioned from (0,0) to (0,3) to the LFSR circuit 201 to generate a new mask seed value. The LFSR circuit 201 generates the random value by performing LFSR operation in the last pixel position (0,3) of the previous unit area (a) and updates the pixel input value through feedback the generated random value, and generates the mask seed value with the updated pixel input value.

With repetition of the foregoing process, for pixels from the pixel positions (0,0) to (0, H_SIZE-1) in the first line, the seed value generator 21 generates the mask seed value within the period of the single unit area (a) by the same value and generates mask seed value by the random, uncorrelated mask seed value with respect to a neighboring unit area (a).

If the pixel positioned in a second line is (1,0), the seed value generator 21 determines whether the period of a new unit area (a) begins by using the numbers of frames, lines and pixels counted by the counter 23.

The counted number of lines is 1 and the number of the pixel is 0. Even though the period of the new unit area (a) does not begin, the number of lines is changed. Thus, the seed value generator 21 performs LFSR operation with the line input value stored in the input value storage unit 25. Since the line input value is same to the input value in the pixel position (0,0), the mask seed value is generated equal in the pixel positions (0,0) and (1,0) in the same unit area (a).

The pixel positions (1,1) to (1,3) are included within the period of the same unit area (a). Thus, the seed value generator 21 does not perform LFSR operation and instead uses the mask seed value generated in the pixel position (1,0). With the foregoing process, the mask seed value is generated in the pixel positions (1,0) to (1, H_SIZE−1) in the second line. Then, the same mask seed value is generated within the same unit area (a) of line and pixel. Same principle applies until a fourth line, a line equivalent to the period of the unit area (a).

If the pixel position is (4, 0), a start point of a fifth line, the line period of a new unit area (a) begins. Since the period of the new unit area (a) begins, the seed value generator 21 updates the input value input to the LFSR circuit 201.

As described above, the seed value generator 21 updates the line input value with the random value which is outputted by performing LFSR operation in the pixel position (4, H_SIZE−1), the last pixel of the previous period. Then, the seed value generator 21 performs LFSR operation by using the updated line input value, and generates the random mask seed value that is uncorrelated to the mask seed value in the first line to the fourth line of the previous unit areas (a).

Hereafter, the second frame will be described. The period T of the unit area (a) in the frame is 2. If the second frame is input with a frame count number of 1 and the pixel position is (0,0), 1%2=1. Then, the seed value generator 21 may determine that the frame period of a new unit area (a) does not begin.

Thus, a frame input value same to the input value in the pixel position (0,0) in the first frame is input to the LFSR circuit 201. Since the same value is input to the LFSR circuit 201 to generate the mask seed value, the mask seed value in the pixel position (0,0) in the second frame is the same as the mask seed value in the pixel position (0,0) in the first frame.

The mask seed value is generated in the second frame with the same method as that in the first frame.

Lastly, a pixel position (0,0) in a third frame will be described. Since the counted number of frame is 2 and a period T of a unit area (a) in the third frame is 2, 2%2=0. The seed value generator 21 may determine that the period of a new unit area (a) begins.

The seed value generator 21 updates the frame input value with a random value which is outputted by performing LFSR operation in the pixel position (V_SIZE−1, H_SIZE−1) in the second frame, i.e. the last pixel of the previous unit area (a). Through performing LFSR operation by using the updated frame input value, the pixel position (0,0) in the previous frame and the pixel position (0,0) in the current frame are generated with the random (uncorrelated) mask seed values from each other.

The dithering performer 27 checks the mask matrix corresponding to the mask seed value generated by the seed value generator 21. The respective pixels of the mask matrix have a preset value. The dithering performer 27 performs dithering to the input image by using the mask matrix. The dithering performer 27 supplies the dithered image processed per unit area (a) to the display unit 30 to be displayed thereon.

Figure 6A:
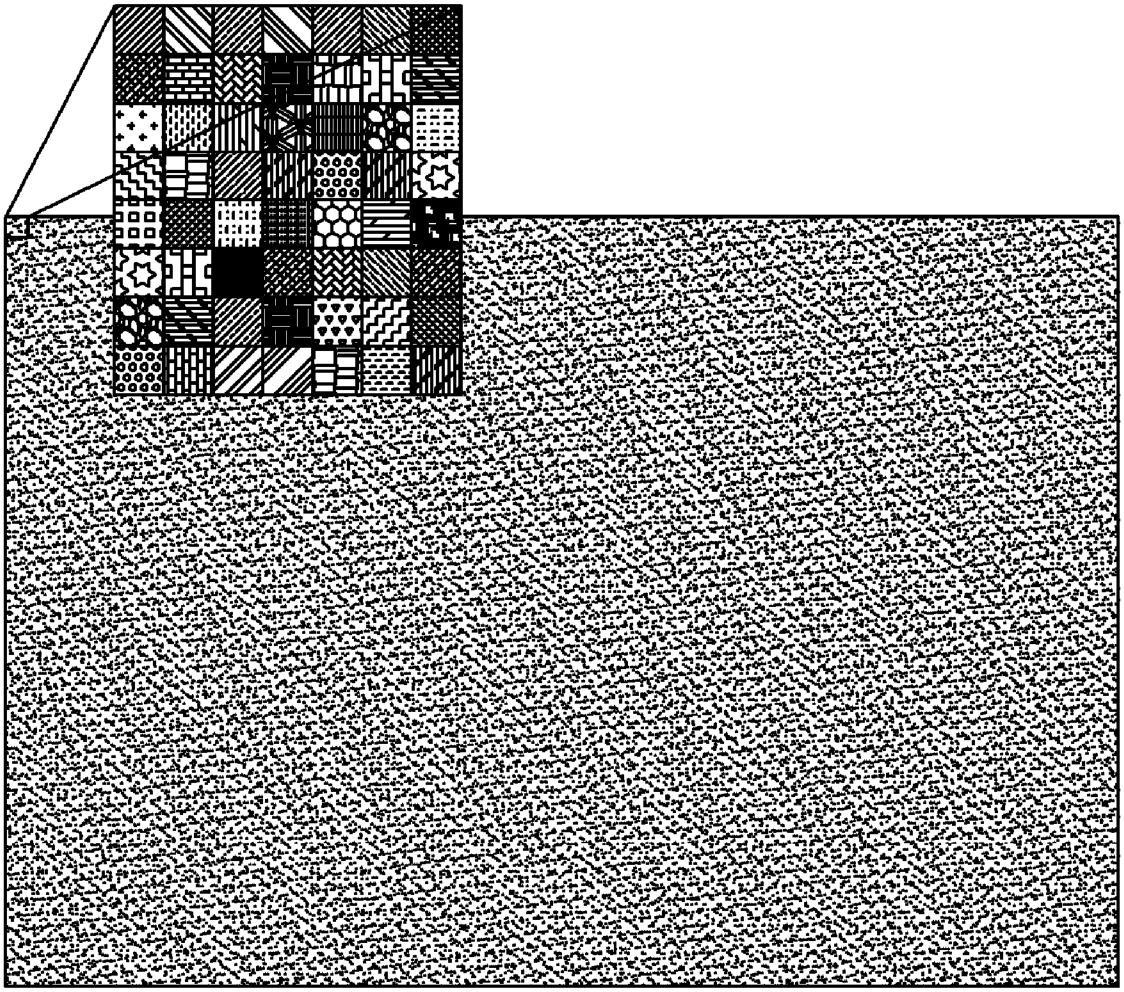
FIG. 6A illustrates an application of the mask seed value in a unit area generated by the related art image processing apparatus.
Figure 6B:
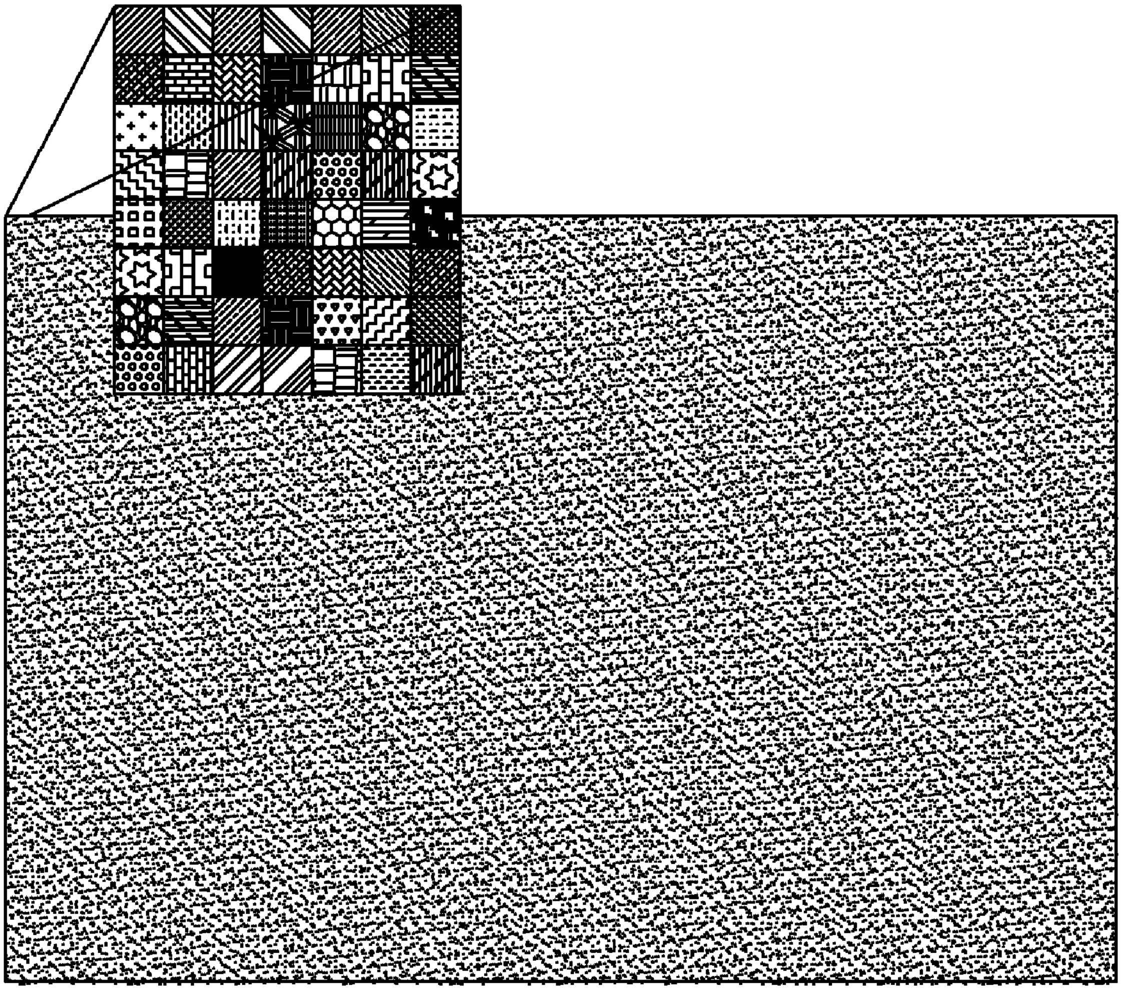
FIG. 6B illustrates an application of the mask seed value in a unit area generated by the image processing apparatus according to the exemplary embodiment of the present invention.

FIGS. 6A and 6B illustrate application of the mask seed value generated per unit area (a). FIG. 6A illustrates the mask seed value generated by using a related art frame buffer and a line buffer. FIG. 6B illustrates a mask seed value generated without the frame buffer and the line buffer, according to an exemplary embodiment of the present invention.

As shown in FIG. 6B, the image processing apparatus according to an exemplary embodiment of the present invention generates the mask seed value identical to that of the related art image processing apparatus, without using the frame buffer and the line buffer.

Then, only the input value is stored to generate the mask seed value and perform dithering to an image, instead of storing the mask seed value generated per line and frame.

Thus, the mask seed value is random by each unit area (a) and same in the same unit area (a) by using only the input value.

Further, the mask seed value is generated without the frame buffer and the line buffer, thereby reducing production costs and improving processing speed.

A control method of the image processing apparatus according to the exemplary embodiment of the present invention will be described with reference to FIGS. 7 and 8.

Figure 7:
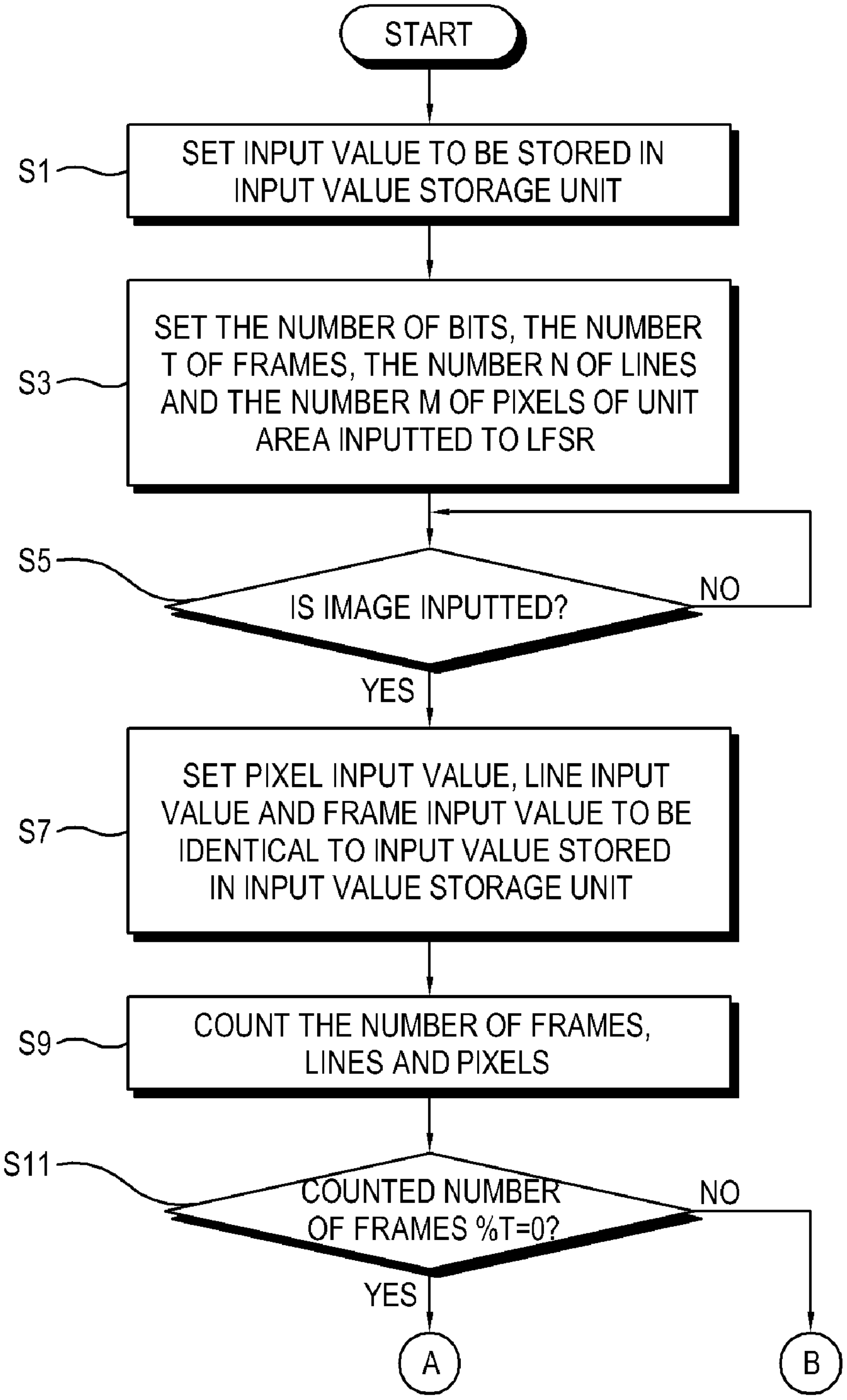
FIGS. 7 and 8 are flowcharts which illustrate a control method of the image processing apparatus according to the exemplary embodiment of the present invention.
Figure 8:
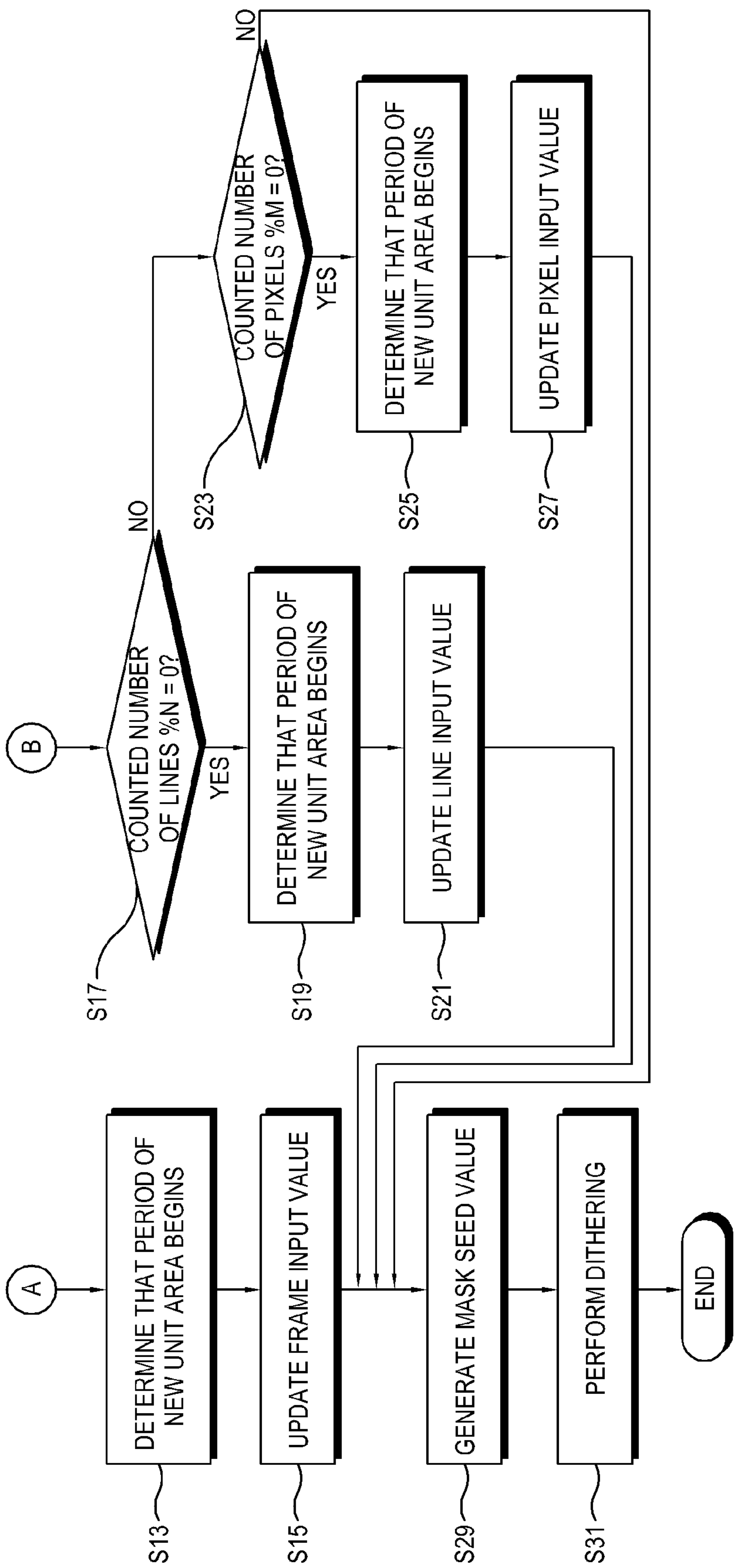

As shown in FIGS. 7 and 8, the input value is stored in the input value storage unit 25 (S1). Here, the input value stored in the input value storage unit 25 is input to the seed value generator 21 to generate the mask seed value.

The number of bits of the input value, the number T of the frames, the number N of lines and the number M of pixels included in the unit area (a) are set to be input to the LFSR circuit 201 of the seed value generator 21 (S3).

If the image is input (S5), the pixel input value, the line input value and the frame input value are set same to the input value stored in the input value storage unit 25 (S7).

The counter 23 then counts the number of frames, lines and pixels (S9), and checks the pixel position displaying the image. As described above, the counter 23 may count the number of frames, lines and pixels by using the synchronous signal input together with the image by the signal input unit 10. The seed value generator 21 determines whether the period of the new unit area (a) begins by using the values counted by the counter 23.

The seed value generator 21 divides the counted number of frames by the number T of frames included in the unit area (a), and determines whether the remainder is 0 (S11).

If it is determined at operation S11 that the remainder is 0, the seed value generator 21 determines that the period of the new unit area (a) begins (S13).

Then, the seed value generator 21 updates the frame input value with the random value which is generated by performing LFSR operation in the last pixel of the previous unit area (S15), and generates the mask seed value by performing LFSR (S29).

The dithering performer 27 performs dithering by using the generated mask seed value (S31).

If it is determined at operation S11 that the remainder is not 0, the seed value generator 21 divides the counted number of lines by the number M of lines included in the unit area (a), and determines whether the remainder is 0 (S17).

If it is determined at operation S17 that the remainder is 0, the seed value generator 21 determines that the period of the new unit area (a) begins (S19).

Then, the seed value generator 21 updates the line input value with the random value which is generated by performing LFSR operation in the last pixel of the previous unit area (a) (S21), and generates the mask seed value by performing LFSR operation (S29).

The dithering performer 27 performs dithering by using the generated mask seed value (S31).

If it is determined at operation S17 that the remainder is not 0, the seed value generator 21 divides the counted number of pixels by the number M which is a number of pixels of the line included in the unit area (a), and determines whether the remainder is 0 (S23).

If it is determined at operation S23 that the remainder is 0, the seed value generator 21 determines that the period of the new unit area (a) begins (S25).

The seed value generator 21 updates the pixel input value with the random value which is generated by performing LFSR operation in the last pixel of the previous unit area (a) (S27), and generates the mask seed value by performing LFSR operation (S29).

The dithering performer 27 performs dithering by using the generated mask seed value (S31).

If it is determined at operation S23 that the remainder is not 0, the seed value generator 21 determines that the period of the new unit area (a) does not begin, and performs LFSR operation to generate the mask seed value (S29).

The dithering performer 27 performs dithering by using the generated mask seed value (S31).

Thus, only the input value is stored to generate the mask seed value and perform dithering to the image, instead of storing the mask seed value generated per line and frame.

Thus, the mask seed value can be generated same within same unit area (a) but random with other unit area (a) by using only the input value.

Further, the mask seed value is generated without the frame buffer and the line buffer, thereby reducing production costs and improving processing speed.

As described above, an exemplary embodiment of the present invention provides an image processing apparatus which generates a mask seed value to perform dithering to an image by storing only an input value, instead of storing a mask seed value generated per line and frame, and a control method thereof.

Also, an exemplary embodiment of the present invention provides an image processing apparatus which generates a mask seed value that is random with other unit area and same within the unit area without a line buffer and a frame buffer, and a control method thereof.

Further, an exemplary embodiment of the present invention provides an image processing apparatus which generates a mask seed value without a frame buffer and a line, and reduces production costs and improves a processing speed, and a control method thereof.

Although a few exemplary embodiments of the present invention have been shown and described, it will be appreciated by those skilled in the art that changes may be made in these exemplary embodiments without departing from the principles and spirit of the invention, the scope of which is defined in the appended claims and their equivalents.

What is claimed is:

1. An image processing apparatus which performs dithering to an input image, comprising:

an input value storage unit which stores an input value to generate a mask seed value corresponding to a single pixel in a unit area among a plurality of pixels displaying the input image, wherein the unit area comprises a first line and at least one second line; and a seed value generator which generates the mask seed value corresponding to one of pixels in the at least one second line among the pixels of the unit area based on the input value stored in the input value storage unit, wherein the seed value generator comprises a linear feedback shift register (LFSR) which generates a random number based on the input value, and the seed value generator generates the mask seed value based on the generated random number, and wherein the random number is generated based on a relation $2^{LFSR\_BIT} \geqq H\_SIZE \times V\_SIZE$, where LFSR_BIT is a number of bits of the input value, H-SIZE is a horizontal size of the input image and V_SIZE is a vertical size of the input image.

2. The image processing apparatus according to claim 1, wherein the seed value generator comprises a linear feedback shift register (LFSR).

3. The image processing apparatus according to claim 2, wherein the seed value generator operates the LFSR based on the input value, and generates the mask seed value based on an output value which is output by the LFSR.

4. The image processing apparatus according to claim 3, wherein the seed value generator feeds back an output value of a previous unit area to generate a random mask seed value with respect to a neighboring unit area.

5. The image processing apparatus according to claim 4, wherein the input value stored in the input value storage unit comprises at least one of a frame input value, a line input value and a pixel input value, and the seed value generator updates one of the frame input value, the line input value and the pixel input value stored in the input value storage unit with the output value of the previous unit area, and generates a changed mask seed value.

6. The image processing apparatus according to claim 5, further comprising a pixel counter which counts a number of pixels of the input image, wherein the seed value generator determines whether a period of a new unit area begins based on the number of pixels counted by the pixel counter, and updates the pixel input value if it is determined that the period of the new unit area begins.

7. The image processing apparatus according to claim 5, further comprising a line counter which counts the number of lines of the input image, wherein the seed value generator determines whether a period of a new unit area begins based on the number of lines counted by the line counter, and updates the line input value if it is determined that the period of the new unit begins.

8. The image processing apparatus according to claim 5, further comprising a frame counter which counts a number of frames of the input image, wherein the seed value generator determines whether a period of a new unit area begins based on the number of frames counted by the frame counter, and updates a frame input value if it is determined that the period of the new unit begins.

9. The image processing apparatus according to claim 1, wherein the input value stored in the input value storage unit is set by a user.

10. The image processing apparatus according to claim 1, further comprising a dithering performer which performs dithering by using the mask seed value generated by the seed value generator.

11. The image processing apparatus according to claim 10, further comprising a display unit which displays an image signal that is dithered by the dithering performer.

12. An image processing apparatus which performs dithering to an input image, comprising:

an input value storage unit which stores an input value to generate a mask seed value corresponding to a single pixel in a unit area among a plurality of pixels displaying the input image, wherein the unit area comprises a first frame and at least one second frame; and a seed value generator which generates the mask seed value corresponding to one of pixels in the at least one second frame among the pixels of the unit area, based on the input value stored in the input value storage unit, wherein the seed value generator comprises a linear feedback shift register (LFSR) which generates a random number based on the input value, and the seed value generator generates the mask seed value based on the generated random number, and wherein the random number is generated based on a relation $2^{LFSR\_BIT} \geqq H\_SIZE \times V\_SIZE$, where LFSR_BIT is a number of bits of the input value, H-SIZE is a horizontal size of the input image and V_SIZE is a vertical size of the input image.

13. A control method of an image processing apparatus which performs dithering to an input image, comprising:

storing an input value to generate a mask seed value corresponding to a single pixel in a unit area among a plurality of pixels displaying the input image, wherein the unit area comprises a first line and at least one second line; and generating the mask seed value corresponding to one of pixels in the at least one second line among the pixels of the unit area based on the stored input value, wherein the mask seed value is generated based on a random number generated based on the input value, and wherein the random number is generated based on a relation $2^{LFSR\_BIT} \geqq H\_SIZE \times V\_SIZE$, where LFSR_BIT is a number of bits of the input value, H-SIZE is a horizontal size of the input image and V_SIZE is a vertical size of the input image.

14. The control method according to claim 13, wherein the generating the seed value comprises generating the seed value by using a linear feedback shift register (LFSR).

15. The control method according to claim 14, wherein the generating the seed value comprises operating the LFSR based on the input value, and generating the mask seed value based on an output value which is output by the LFSR.

16. The control method according to claim 15, wherein the generating the seed value comprises feeding back the output value of a previous unit area to generate a random mask seed value with respect to a neighboring unit area.

17. The method according to claim 16, wherein the input value comprises at least one of a frame input value, a line input value and a pixel input value, and generating the seed value comprises updating one of the stored frame input value, line input value and pixel input value with the output value of the previous unit area, and generating a changed mask seed value.

18. The control method according to claim 17, further comprising counting a number of pixels of the input image, wherein the generating the seed value comprises determining whether a period of a new unit area begins, based on the counted number of pixels, and updating the pixel input value if the period of the new area begins.

19. The control method according to claim 17, further comprising counting a number of lines of the input image, wherein the generating the seed value comprises determining whether a period of a new unit area begins, based on the counted number of lines, and updating the line input value if the period of the new unit area begins.

20. The control method according to claim 17, further comprising counting a number of frames of the input image, wherein the generating the seed value comprises determining whether a period of a new unit area begins, based on the counted number of frames, and updating the frame input value if the period of the new unit area begins.

21. A control method of an image processing apparatus which performs dithering to an input image, comprising:

storing an input value to generate a mask seed value corresponding to a single pixel in a unit area among a plurality of pixels displaying the input image, wherein the unit area comprises a first frame and at least one second frame; and generating the mask seed value corresponding to one of pixels in the at least one second frame among the pixels of the unit area, based on the stored input value, wherein the mask seed value is generated based on a random number generated based on the input value, and wherein the random number is generated based on a relation $2^{LFSR\_BIT} \geqq H\_SIZE \times V\_SIZE$, where LFSR_BIT is a number of bits of the input value, H-SIZE is a horizontal size of the input image and V_SIZE is a vertical size of the input image.

* * * * *